(12) United States Patent
Donnelly

(10) Patent No.: US 9,238,728 B2
(45) Date of Patent: Jan. 19, 2016

(54) EPOXIDIZED FATTY ACID ALKYL ESTERS AS FLEXIBILIZERS FOR POLY(LACTIC ACID)

(75) Inventor: Zuzanna Donnelly, Ardmore, PA (US)

(73) Assignee: Arkema Inc., King of Prussia, PA (US)

( * ) Notice: Subject to any disclaimer, the term of this patent is extended or adjusted under 35 U.S.C. 154(b) by 40 days.

(21) Appl. No.: 13/981,411

(22) PCT Filed: Jan. 20, 2012

(86) PCT No.: PCT/US2012/021976
§ 371 (c)(1),
(2), (4) Date: Jul. 24, 2013

(87) PCT Pub. No.: WO2012/102952
PCT Pub. Date: Aug. 2, 2012

(65) Prior Publication Data
US 2013/0303653 A1    Nov. 14, 2013

Related U.S. Application Data

(60) Provisional application No. 61/435,643, filed on Jan. 24, 2011.

(51) Int. Cl.
| | |
|---|---|
| *C08K 5/1515* | (2006.01) |
| *C08L 67/04* | (2006.01) |
| *C08L 3/02* | (2006.01) |
| *C08L 67/00* | (2006.01) |

(52) U.S. Cl.
CPC ............... *C08K 5/1515* (2013.01); *C08L 3/02* (2013.01); *C08L 67/04* (2013.01)

(58) Field of Classification Search
None
See application file for complete search history.

(56) References Cited

U.S. PATENT DOCUMENTS

| | | | | |
|---|---|---|---|---|
| 4,551,485 | A * | 11/1985 | Ragan et al. | 523/212 |
| 5,498,650 | A * | 3/1996 | Flexman et al. | 524/114 |
| 5,753,782 | A * | 5/1998 | Hammond et al. | 525/450 |
| 5,798,435 | A | 8/1998 | Gruber et al. | |
| 6,797,753 | B2 | 9/2004 | Benecke et al. | |
| 2005/0182201 | A1 | 8/2005 | Matsumoto et al. | |
| 2009/0110942 | A1 | 4/2009 | Henderson-Rutgers et al. | |
| 2009/0171065 | A1* | 7/2009 | Nakamura et al. | 528/356 |
| 2009/0253871 | A1 | 10/2009 | Flynn et al. | |
| 2010/0089289 | A1 | 4/2010 | Mahiat et al. | |
| 2010/0292373 | A1* | 11/2010 | Selifonov | 524/108 |

FOREIGN PATENT DOCUMENTS

| | | |
|---|---|---|
| CN | 1687205 A | 10/2005 |
| CN | 101037532 | 9/2007 |
| IN | 02868DN2007 A | 8/2007 |
| JP | 11116785 A2 | 4/1999 |
| JP | 11286403 A2 | 10/1999 |
| JP | 2007002128 A2 | 6/2005 |
| JP | 2007138097 A2 | 11/2005 |
| JP | 2006143829 A2 | 6/2006 |
| WO | WO 2009/102877 A1 | 8/2009 |
| WO | WO 2009/147606 A9 | 12/2009 |
| WO | WO 2010/006101 A2 | 1/2010 |
| WO | WO 2010/006101 A3 | 1/2010 |
| WO | WO 2012/036913 A2 | 3/2012 |

* cited by examiner

*Primary Examiner* — Peter A Salamon
(74) *Attorney, Agent, or Firm* — Lynn B. Morreale

(57) ABSTRACT

A composition containing (a) at least one biodegradable/biorenewable thermoplastic material that includes poly(lactic acid) (PLA); and (b) at least one plasticizer that includes an epoxidized fatty acid alkyl ester is provided. In some embodiments, the epoxidized fatty acid alkyl ester is methyl epoxy soyate. It was found that epoxidized fatty acid alkyl esters impart a reduction in tensile modulus in compositions containing PLA. The compositions may be formed into films, such as those used in food packaging. A method that includes extruding a composition comprising PLA and at least one epoxidized fatty acid alkyl ester is provided.

26 Claims, No Drawings

EPOXIDIZED FATTY ACID ALKYL ESTERS AS FLEXIBILIZERS FOR POLY(LACTIC ACID)

CROSS-REFERENCE TO RELATED APPLICATIONS

This application is a national stage application under 35 U.S.C. §371 of PCT/US2012/021976, filed Jan. 20, 2012, which claims benefit to U.S. patent application Ser. No. 61/435,643 filed on Jan. 24, 2011, all of which are hereby incorporated by reference herein in their entireties.

FIELD OF THE INVENTION

This invention relates to compositions containing a biodegradable/biorenewable thermoplastic material that includes poly(lactic acid) (PLA) and a plasticizer that includes an epoxidized fatty acid alkyl ester. Compositions of the present invention can be used in a variety of useful articles, such as films and food packaging, and provide reduced stiffness and improved flexibility compared to current compositions that contain PLA.

BACKGROUND OF THE INVENTION

Growing global concern over persistent plastic waste has generated much interest in biodegradable polymers for everyday use. Biodegradable polymers based on poly(lactic acid) (PLA) are an attractive alternative as they can be readily produced from renewable agriculture sources. Recent developments in manufacturing polymers from agricultural sources have accelerated the emergence of these polymers in the biodegradable plastic commodity market.

PLA is generally perceived as having a high tensile modulus, which leads to undesirable properties, such as stiffness and lack of flexibility, when PLA is used in food packaging or other types of films. Plasticizers are often used to reduce the tensile modulus of thermoplastics. Epoxidized oils, such as epoxidized soy bean oil, have been known to plasticize PLA. There is a need for compositions comprising PLA that have a reduced tensile modulus and increased flexibility compared to current compositions.

SUMMARY OF THE INVENTION

An embodiment of the present invention provides a composition containing (a) at least one biodegradable/biorenewable thermoplastic comprising poly(lactic acid); and (b) at least one plasticizer comprising an epoxidized fatty acid alkyl ester.

The invention further provides a film, such as a food packaging material, comprising the composition described above and preferably provides a reduced tensile modulus compared to poly(lactic acid) compositions that do not contain an epoxidized fatty acid alkyl ester.

The invention further provides methods for making a composition that includes blending (a) at least one thermoplastic material comprising poly(lactic acid); and (b) at least one plasticizer comprising an epoxidized fatty acid alkyl ester.

DETAILED DESCRIPTION OF THE INVENTION

The present invention provides compositions containing (a) at least one biodegradable/biorenewable thermoplastic material comprising poly(lactic acid); and (b) at least one plasticizer comprising an epoxidized fatty acid alkyl ester. The epoxidized fatty acid alkyl ester in one embodiment is an epoxidized fatty acid methyl ester, and in another embodiment is an epoxidized methyl ester of a soy fatty acid (i.e., methyl epoxy soyate). Epoxidized fatty acid alkyl esters, such as methyl epoxy soyate, were found to lower the tensile modulus of compositions comprising poly(lactic acid) (PLA), particularly when included at above 5% weight based on the total weight of the composition. While epoxidized vegetable oils have previously been known to act as a plasticizer for PLA, it has surprisingly been found that a plasticizer comprising an epoxidized fatty acid alkyl ester, such as methyl epoxy soyate, imparts a much greater reduction in tensile modulus when used in the same amount as epoxidized vegetable oils in compositions comprising PLA. The present invention contemplates films, such as food packaging materials, that contain compositions according to the present invention.

The term "poly(lactic acid)" (PLA) as used herein refers to a polymer or copolymer containing at least 50 mol % of lactic acid monomer units. Examples of poly(lactic acid) include, but are not limited to, (a) a homopolymer of lactic acid, (b) a copolymer of lactic acid with one or more aliphatic hydroxycarboxylic acids other than lactic acid, (c) a copolymer of lactic acid with an aliphatic polyhydric alcohol and an aliphatic polycarboxylic acid, (d) a copolymer of lactic acid with an aliphatic polycarboxylic acid, (e) a copolymer of lactic acid with an aliphatic polyhydric alcohol, and (f) a mixture of two or more of (a)-(e) above.

Examples of the lactic acid include L-lactic acid, D-lactic acid, DL-lactic acid, a cyclic dimer thereof (i.e., L-lactide, D-lactide or DL-lactide) and mixtures thereof. Examples of the hydroxycarboxylic acid, useful for example in copolymers (b) and (f) above include, but are not limited to, glycolic acid, hydroxybutyric acid, hydroxyvaleric acid, hydroxycaproic acid and hydroxyheptoic acid, and combinations thereof. Examples of the aliphatic polyhydric alcohol monomers useful for example in the copolymers (c), (e), or (f) above include, but are not limited to, ethylene glycol, 1,4-butanediol, 1,6-hexanediol, 1,4-cyclohexanedimethanol, neopentyl glycol, decamethylene glycol, glycerin, trimethylolpropane and pentaerythritol and combinations thereof. Examples of the aliphatic polycarboxylic acid monomers useful for example in the copolymers (c), (d), or (f) above include, but are not limited to, succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride and combinations thereof.

As mentioned above, the present invention provides compositions comprising a biodegradable/biorenewable thermoplastic material comprising poly(lactic acid) and a plasticizer comprising an epoxidized fatty acid alkyl ester. The epoxidized fatty acid alkyl ester is present in an amount greater than a trace amount (i.e., greater than a trace amount of an epoxidized fatty acid alkyl ester that is present as a contaminant in one of the other constituents of the composition, such as an epoxidized oil). In one embodiment, a composition according to the present invention comprises, by weight of the composition, between about 5 wt % to about 30 wt %, or about 10 wt % to about 20 wt %, epoxidized fatty acid alkyl ester based on the total weight of the composition. In another embodiment, the composition comprises more than 5% epoxidized fatty acid alkyl ester, and in other embodiments at least 10% epoxidized fatty acid alkyl ester by weight based on the total weight of the composition. In one embodiment, an amount of epoxidized fatty acid alkyl ester is employed which is sufficient to reduce the tensile modulus at least 10%, at least 20%, at least 30%, at least 40%, or at least 50% relative to an unplasticized composition.

The epoxidized fatty acid alkyl ester may include a $C_1$ to $C_8$ alkyl ester of an epoxidized $C_{14}$-$C_{22}$ fatty acid. In one embodiment, epoxidized fatty acid alkyl esters of vegetable oils such as epoxidized fatty acid alkyl esters of olive oil, peanut oil, corn oil, cottonseed oil, soybean oil, linseed oil, and/or coconut oil are used. In one embodiment, methyl epoxy soyate is used. In other embodiments, the epoxidized fatty acid alkyl ester may be selected from the group consisting of epoxidized biodiesel and epoxidized derivatives of biodiesel. In another embodiment, the epoxidized fatty acid alkyl ester is an epoxidized castor oil-based fatty acid alkyl ester. The alkyl group present in the epoxidized fatty acid alkyl ester may be, for example, a $C_1$-$C_6$ straight chain, branched or cyclic aliphatic group such as methyl, ethyl, n-propyl, isopropyl, n-butyl, sec-butyl, cyclohexyl and the like. The epoxidized fatty acid alkyl ester may comprise a mixture of esters containing different alkyl groups.

The plasticizer of the invention may consist of a single epoxidized fatty acid alkyl esters, or may comprise a blend of multiple epoxidized fatty acid alkyl esters. In other embodiments, the plasticizer may further comprise an epoxidized oil, preferably epoxidized soybean oil, in combination with one or more epoxidized fatty acid alkyl esters.

By the term "epoxidized fatty acid alkyl esters" it is meant fatty acid alkyl esters that are at least partially to fully epoxidized.

Compositions according to the present invention may include one or more epoxidized additives. In certain embodiments, these additives may be present in an amount of from about 0 wt % to about 20 wt % based on the total weight of the composition. The epoxidized additives may be selected from fatty acids or derivatives thereof, monoglycerides, diglycerides, triglycerides, animal fats, animal oils, vegetable fats, or vegetable oils or combinations thereof. Examples of such epoxidized additives include, without limitation, linseed oil, soybean oil, cottonseed oil, ground nut oil, sunflower oil, rape seed oil, canola oil, sesame seed oil, olive oil, corn oil, safflower oil, peanut oil, sesame oil, hemp oil, tung oil, neat's food oil, whale oil, fish oil, castor oil, or tall oil, or combinations thereof.

The biodegradable/biorenewable thermoplastic material of the invention may consist of a single thermoplastic material such as a polymer (e.g., PLA only) or may comprise a mixture of PLA with at least one additional thermoplastic material. In one embodiment, the biodegradable/biorenewable thermoplastic material may comprise a blend of PLA with one or more aliphatic copolyesters, polyhydroxy alkanoates (PHA), starches, celluloses, or other polysaccharides or combinations thereof. In other embodiments, the biodegradable/biorenewable thermoplastic material may comprise a blend of PLA with at least one aliphatic copolyester, a blend of PLA with at least one polyhydroxy alkanoate (PHA), or a blend of PLA with another biopolymer, such as starch, cellulose, or another polysaccharide. In one embodiment, the biodegradable/biorenewable thermoplastic material may comprise a blend of PLA, at least one PHA, and at least one starch. In certain embodiments, the thermoplastic material is present in an amount of about 5% wt to about 95% wt and in other embodiments from about 30% wt to about 95% wt based on the total weight of the composition. In certain embodiments the amount of PLA relative to the total amount of thermoplastic material in the composition is from about 15 wt % to about 100% and in other embodiments from about 30 wt % to about 100 wt % based on the total weight of the thermoplastic material.

In a preferred embodiment, the tensile modulus of the composition (as measured by ASTM D638) is reduced by at least 30% compared to a plasticizer-free composition comprising PLA. The tensile modulus of the composition is preferably less than that of a composition that comprises PLA and an epoxidized oil, such as epoxidized soybean oil, and that does not contain an epoxidized fatty acid alkyl ester in an amount greater than a trace amount (i.e., a trace amount of an epoxidized fatty acid alkyl ester that is present in the epoxidized oil as a contaminant, e.g., less than about 2 wt % to about 3 wt % based on the total weight of the epoxidized oil). Compositions according to the present invention are preferably used in films, such as those used in food packaging. By providing a reduced tensile modulus, the compositions provide more flexibility (i.e., less stiffness and more malleability) to food packaging and other films, compared to compositions that contain PLA, an epoxidized oil, and no epoxidized fatty acid alkyl esters, or compositions that contain PLA and no plasticizers.

Compositions according to the present invention may further comprise a castor oil-based fatty acid ester to provide added impact resistance, which is useful in a variety of packaging materials or containers. The compositions may also optionally contain one or more additional additives known for use in thermoplastics, including, but not limited to fillers, process aids, impact modifiers, colorants, pigments, flame retardants, dyes, stabilizers, UV stabilizers, lubricants, surfactants, or combinations thereof In some embodiments, these optional additives may be present in an amount of up to about 50 wt % based on total weight of the composition.

In one embodiment, the composition consists essentially of, or consists only of, PLA, an epoxidized fatty acid alkyl ester, optionally one or more additional biodegradable/biorenewable thermoplastic materials, and optionally one or more additional epoxidized additives. For example, in one embodiment, the composition consists essentially of, or consists only of, PLA optionally blended with at least one PHA and/or at least one starch, at least one epoxidized fatty acid alkyl ester, and at least one epoxidized oil, such as epoxidized soybean oil. In another embodiment, the composition does not contain a trimesic acid triamide compound, and in yet another embodiment, the composition does not contain a carbodiimide compound.

The present invention further provides methods for making a composition comprising blending (a) at least one thermoplastic material that includes poly(lactic acid); and (b) at least one plasticizer that includes an epoxidized fatty acid alkyl ester. The ingredients of the composition may be admixed prior to processing, or may be combined during one or more processing steps, such as in a melt-blending operation. This can be done, for instance, by single-screw extrusion, twin-screw extrusion, Buss kneader, two-roll mill, or impeller mixing. Formation of the blend is not limited to a single-step formation.

The method may include the step of extruding the composition. The thermoplastic material and plasticizer may be blended prior to extruding the composition, or may be blended during extrusion. The method may include a further step of forming the composition into food packaging or another type of film. The composition can be processed using any known method, including, but not limited to injection molding, extrusion, calendaring, blow molding, foaming, and thermofoaming. Useful articles that can be made using compositions of the present invention include but are not limited to packaging materials and films. A variety of other useful articles and processes for forming those articles can be contemplated based on the present disclosure.

The following example is provided to describe the invention in further detail. It is intended to illustrate, not limit, the invention.

EXAMPLE 1

Poly(lactic acid) (Natureworks® 2002D) was melt blended with either epoxidized soy fatty acid methyl esters (Arkema Vikoflex® 7010) ("EFAME") or epoxidized soybean oil (Arkema Vikoflex® 7170) ("ESO") in a twin screw extruder. The pelletized extrudate was compression molded into plaques. Sample bars for tensile testing were cut from the plaques. Tensile tests were carried out according to ASTM D638. Results are shown in Table 1 below.

TABLE 1

| Sample | Additive | Wt % Additive | Tensile Modulus (MPa) |
| --- | --- | --- | --- |
| 1 | None | 0 | 269.8 |
| 2 | EFAME | 5 | 247.8 |
| 3 | EFAME | 10 | 184.3 |
| 4 | EFAME | 15 | 99.5 |
| 5 | ESO | 5 | 246.7 |
| 6 | ESO | 10 | 266.7 |
| 7 | ESO | 15 | 213.1 |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A composition consisting essentially of a blend of:
   (a) at least one biodegradablel/biorenewable thermoplastic material comprising poly(lactic acid); and
   (b) at least one plasticizer comprising an epoxidized fatty acid alkyl ester of at least one of the following: i) $C_{14}$-$C_{22}$ fatty acid, ii) vegetable oil, and iii) biodiesel and biodiesel derivatives,
   wherein the alkyl group in the epoxidized fatty acid alkyl ester is selected from the group consisting of $C_1$-$C_6$ straight chain, branched and cyclic aliphatic groups,
   wherein the composition includes, based on total weight of the composition, between about 5 wt % to about 30 wt % epoxidized fatty acid alkyl ester,
   wherein the compositon further optionally includes at least one additive selected from at least one of filler, colorant, pigment, a flame retardant, a dye, a stabilizer, a UV stabilizer, a lubricant, a surfactant and combinations thereof and wherein the tensile modulus of the composition, as measured by ASTMD638, is reduced by at least 30% compared to a plasticizer free composition comprising ply(lactic acid).

2. The composition of claim 1, wherein the epoxidized fatty acid alkyl ester is an epoxidized fatty acid methyl ester.

3. The composition of claim 1, wherein the epoxidized fatty acid alkyl ester is methyl epoxy soyate.

4. The composition of claim 1, wherein the epoxidized fatty acid alkyl ester is an epoxidized fatty acid alkyl ester of a vegetable oil.

5. The composition of claim 1, wherein the epoxidized fatty acid alkyl ester is selected from the group consisting of epoxidized biodiesel and epoxidized derivatives of biodiesel.

6. The composition of claim 1, wherein the epoxidized fatty acid alkyl ester is an alkyl ester of an epoxidized $C_{14}$-$C_{22}$ fatty acid.

7. The composition of claim 1, wherein the epoxidized fatty acid alkyl ester is an epoxidized castor oil-based fatty acid alkyl ester.

8. The composition of claim 1, wherein the plasticizer comprises a blend of multiple epoxidized fatty acid alkyl esters.

9. The composition of claim 1, wherein the plasticizer further comprises an epoxidized oil.

10. The composition of claim 9, wherein the epoxidized oil comprises epoxidized soybean oil.

11. The composition of claim 1, wherein the composition further comprises one or more epoxidized additives, the epoxidized additives selected from one or more fatty acids and derivatives thereof, monoglycerides, diglycerides, triglycerides, animal fats, animal oils, vegetable fats, or vegetable oils, or combinations thereof.

12. The composition of claim 11 wherein the epoxidized additive is selected from linseed oil, soybean oil, cottonseed oil, ground nut oil, sunflower oil, rape seed oil, canola oil, sesame seed oil, olive oil, corn oil, safflower oil, peanut oil, sesame oil, hemp oil, tung oil, neat's food oil, whale oil, fish oil, castor oil, tall oil, or combinations thereof.

13. The composition of claim 1, wherein the thermoplastic material comprises a blend of poly(lactic acid) and least one additional thermoplastic material.

14. The composition of claim 1, wherein the thermoplastic material comprises a blend of poly(lactic acid) and at least one aliphatic copolyester.

15. The composition of claim 1, wherein the thermoplastic material comprises a blend of poly(lactic acid) and at least one polyhydroxy alkanoate.

16. The composition of claim 1, wherein the thermoplastic material comprises a blend of poly(lactic acid), at least one polyhydroxy alkanoate, and at least one starch.

17. The composition of claim 1, wherein the thermoplastic comprises a blend of poly(lactic acid) and at least one starch.

18. The composition of claim 1, wherein the composition includes, based on total weight of the composition, at least 10 wt % epoxidized fatty acid alkyl ester.

19. A film comprising the composition of claim 1.

20. A food package comprising the composition of claim 1.

21. A method for making a composition of claim 1 comprising blending (a) at least one said thermoplastic material comprising poly(lactic acid); and (b) at least one said plasticizer comprising an epoxidized fatty acid alkyl ester.

22. The method of claim 21, comprising extruding the composition.

23. The method of claim 22, wherein the thermoplastic material and the plasticizer are blended prior to extruding the composition.

24. The method of claim 21, wherein the epoxidized fatty acid alkyl ester is methyl epoxy soyate.

25. The method of claim 21, comprising a further step of forming the composition into a film.

26. The method of claim 21, comprising a further step of forming the composition into food packaging.

* * * * *